(12) United States Patent
Krause et al.

(10) Patent No.: US 6,302,933 B1
(45) Date of Patent: *Oct. 16, 2001

(54) APPARATUS FOR SEPARATING LIQUID FROM GASES

(75) Inventors: Wolfgang Krause, Waibstadt; Karl-Heinrich Spies, Birkenau; Klaus Döhring, Heidelberg; Klaus Kurr, Weinheim, all of (DE)

(73) Assignee: Firma Carl Freudenberg, Weinheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,882

(22) Filed: Nov. 11, 1998

Related U.S. Application Data

(63) Continuation of application No. 08/061,950, filed on May 13, 1993, now abandoned.

(30) Foreign Application Priority Data

Jul. 3, 1992 (DE) .................................................. 42 21 885

(51) Int. Cl.⁷ ............................ B01D 19/00; B01D 39/12
(52) U.S. Cl. ............................ 55/350.1; 55/426; 55/465; 55/482; 96/187; 96/190; 96/219; 96/220
(58) Field of Search .............................. 96/187–190, 206, 96/207, 215, 219, 220; 55/350.1, 392, 426, 427, 438, 462, 465

(56) References Cited

U.S. PATENT DOCUMENTS

| | | | | |
|---|---|---|---|---|
| 2,170,704 | * | 8/1939 | Bourne | 55/392 |
| 2,565,690 | * | 8/1951 | Ketelson | 55/427 X |
| 3,000,467 | * | 9/1961 | Bowers | 96/219 |
| 3,370,401 | * | 2/1968 | Lucas et al. | 95/211 |
| 3,570,221 | * | 3/1971 | Oliver | 55/462 X |
| 3,771,287 | * | 11/1973 | Sunderland | 96/187 |
| 3,859,063 | * | 1/1975 | Porter et al. | 55/462 X |
| 3,923,480 | * | 12/1975 | Visch | 55/465 X |
| 4,222,751 | * | 9/1980 | Shunta | 96/187 X |
| 4,622,048 | * | 11/1986 | Roberts et al. | 96/188 |
| 4,806,135 | * | 2/1989 | Siposs | 96/219 X |
| 4,932,987 | * | 6/1990 | Molina | 96/219 X |

FOREIGN PATENT DOCUMENTS

| | | | | |
|---|---|---|---|---|
| 0073125 | * | 9/1951 | (DK) | 55/426 |
| 1216098 | * | 12/1970 | (GB) | 55/350.1 |

* cited by examiner

*Primary Examiner*—Robert H. Spitzer
(74) *Attorney, Agent, or Firm*—Fulbright & Jaworski, LLP

(57) ABSTRACT

The separator (1) has a tubular inlet opening (2) and two tubular outlet openings (3, 4) which are connected with one another in a flow-carrying manner. A separating device (6) is disposed in the flow direction (5) between the inlet opening (2) and the outlet openings (3, 4). One of the outlet openings (3) carries substantially only separated liquid and the other outlet opening (4) carries substantially only gas freed of liquid. An outer tube (7) surrounds an inner tube (8) with an all-around space between them. The inner tube (8) is connected at one end to the inlet opening (2) in a flow-carrying manner, and at the other end is associated with the outlet opening (3) for the separated liquid.

7 Claims, 1 Drawing Sheet

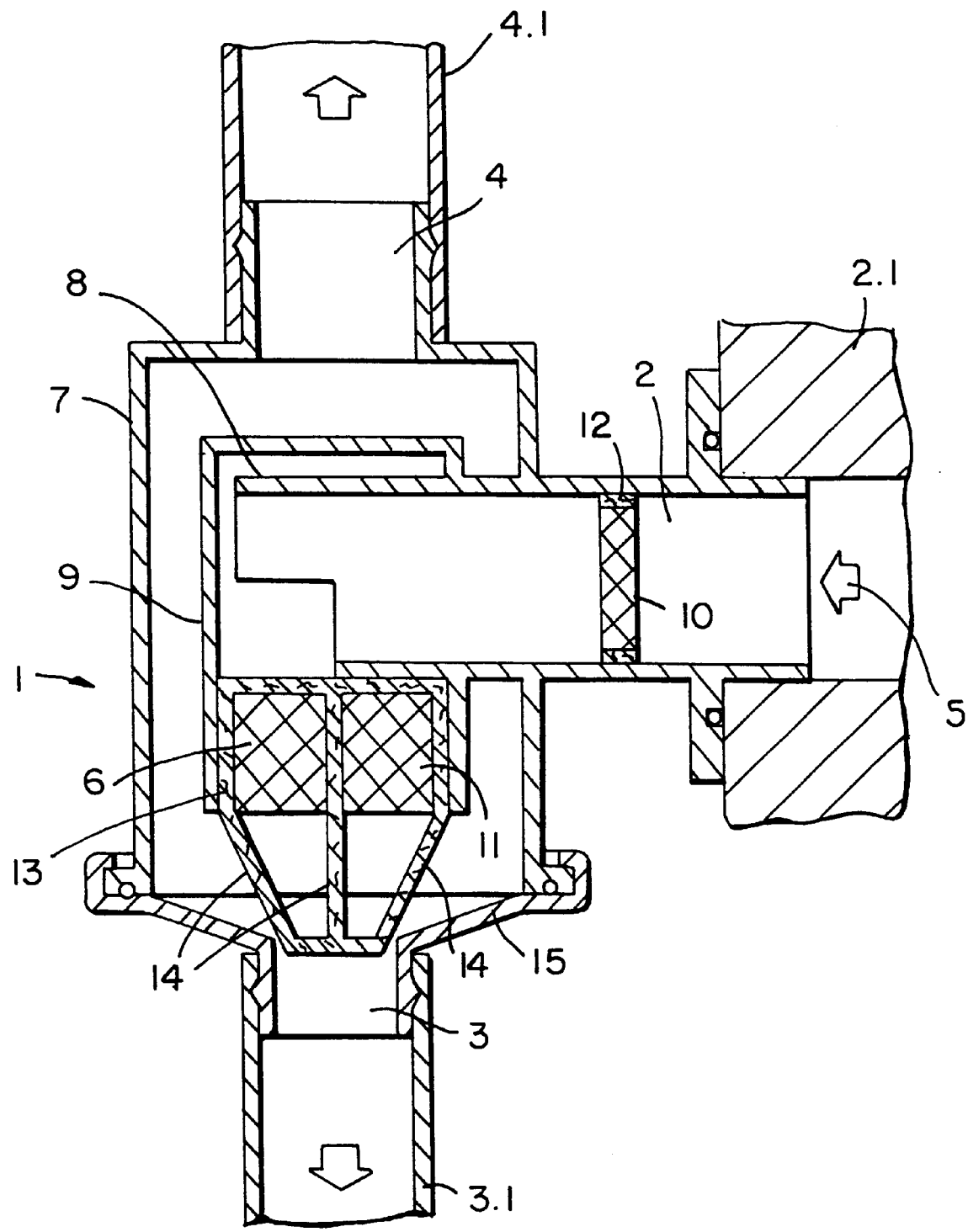

APPARATUS FOR SEPARATING LIQUID FROM GASES

This application is a continuation of U.S. patent application Ser. No. 08/061,950 filed May 13, 1993, abandonded.

BACKGROUND OF THE INVENTION

The invention relates to a liquid separator for the separation of liquid from gases carrying liquid components, including a housing with at least three openings. The openings being formed by a tubular inlet opening and two tubular outlet openings which are connected with one another to carry a flow. At least one separating device is disposed in the direction of flow between the inlet and the outlet openings, and substantially only separated liquid is able to flow through one of the outlet openings and substantially only gas freed of liquid is able to flow through the other outlet opening.

Liquid separators are generally known, and are used, for example, as external oil separators in the field of internal combustion engines. The gases, enriched with liquid components, pass through an inlet opening into the liquid separator and pass at least through one separating means, which can consist, for example, of a wire wool or wire mesh or a disk of nonwoven material. A large part of the liquid components are then deposited, on the basis of their inertia, onto an impact wall that follows in the direction of flow, while the separated fluid is returned through one of the outlet openings into a liquid reservoir, and the gas freed of the fluid is discharged through the other outlet opening. It is to be noted, however, that the degrees of separation are not very satisfactory, and the previously known oil separators tend to ice up at low ambient temperatures of less than −20° C. Their practical properties therefore are not very satisfactory.

SUMMARY OF THE INVENTION

The invention is addressed to achieving substantially better degrees of separation combined with low pressure losses, and to largely forestall the danger of ice-up at low ambient temperatures.

In the scope of the present invention, provision is made for the housing with the inlet opening and the outlet openings to be configured as a jacket tube, for the outer tube to surround an inner tube at an all-around distance therefrom, and for the inner tube to communicate at one end with the inlet opening and to be associated at the other end with the outlet opening for the separated liquid.

It is an advantage that the good practical properties of the liquid separator are largely independent of the external influences. Even at low ambient temperatures, the liquid separator according to the invention is distinguished by good degrees of separation at low pressure losses, and the danger of icing can thereby be reduced to a minimum. The result of the tube-in-tube construction is good insulation of the stream-bearing inner tube and of the icing-endangered separating device by the jacket tube which is directly affected by the external temperatures. The inner tube essentially carries the gas enriched with liquid components and then the separated liquid, while the jacket tube carries substantially only a gaseous medium after the separation of the liquid.

For the purpose of achieving an advantageous embodiment of the liquid separator, the return of the separated liquid can take place through the corresponding outlet opening in the direction of flow, the outlet opening being preferably disposed such that the separated liquid will additionally be affected by the force of gravitation.

The jacket tube can be of an essentially T-shaped configuration, wherein the inlet opening is disposed between two outlet openings situated substantially opposite one another. In this case it is an advantage that the separation of the gas carrying liquid components can be performed simply, and the media separated from one another can easily be carried out of the liquid separator. A jacket tube configured in this manner is advantageous from the production and cost points of view.

The inner tube can be substantially L-shaped and designed as an impact wall. Since the gas carrying liquid components is deflected at a substantially right angle, high degrees of separation can be achieved. The simple geometrical configuration of the inner tube is outstandingly significant. The combination of a T-shaped jacket tube and an L-shaped inner tube makes for economical manufacture.

In one advantageous embodiment, the jacket tube and the inner tube can be configured as a casting in which they merge integrally with one another, and which consists of a tough plastic resistant to the flowing medium. In addition to the light weight of the liquid separator, large numbers of separators can be manufactured economically. A plastic can be used which is adapted to the particular circumstances of the application. Other materials, such as metal materials, can also be used.

If at least the jacket tube is made as a casting it is especially easy to configure the inlet opening and the two outlet openings as mounting flanges which can be brought into sealing engagement with adjoining ducts. For example, annular beads can be made integral with the jacket tube at the inlet opening and outlet openings, and tubes of rubber-elastic material, for example, can be slipped over them and can be fastened at the end adjacent the jacket tube if necessary by a hose clamp. In another embodiment the mounting flange can be configured so as to have holes to accommodate mounting screws by which it can be fastened to a machine part. On the end facing the machine part the mounting flange can be provided, for example, with a groove-like recess into which a sealing ring can be laid for a static seal.

For the improvement of the degree of separation achieved by the liquid separator, a preliminary separator can be placed at the inlet opening, which consists of a mesh through which fluid can pass and which is surrounded by a mounting ring and completely covers the cross section of the inlet opening, the mounting ring being able to be snapped into the inlet opening. It is advantageous in this case that the preliminary separator can easily be replaced if it becomes clogged. The mounting ring, of stable shape, can consist of a tough and hard plastic and can advantageously have the same heat exchange coefficient as the section of tubing that surrounds the inlet opening.

The main separating device can be formed by a replaceable separator cartridge on which the inner tube is force-fitted or positively locked at the end facing the outlet opening through which substantially naught but liquid can flow, the separator cartridge being formed by a tubular cage around a mesh permeable to the flow.

The mesh material of the preliminary separator and separator cartridge can be made, for example, at least of a wire mesh, wire wool or nonwoven material. A metal mesh externally surrounding a nonwoven filter might also be used. When such meshes are used the advantage is that very good degrees of separation can be achieved at low pressure losses. With continued use and the resultant increasing clogging of the mesh, the mesh can be easily replaced by replacing the cartridge. The separator cartridge together with the mesh can be replaced as a whole, or the cage can be reused after replacing only the mesh.

The separator cartridge can have a truncoconical part reaching beyond the inner tube toward the outlet opening, the cage being formed in this part by liquid-guiding struts. Toward the outlet opening through which substantially only separated liquid can flow the truncoconical part has an outside diameter that is circumferentially surrounded by the inside diameter of the outlet opening at the end of the latter. The separated liquid is thus carried particularly quickly and completely away through the outlet opening, without the adjacent jacket tube being excessively wetted by the liquid components.

For ease in replacing the separating cartridge the outlet opening can be made integral with a cover fastened sealingly on the jacket tube by a snap closure or bayonet lock, for example. In this case the end of the truncoconical separating cartridge can serve for centering the cover. This configuration assures easy accessibility of the separating cartridge and its simple replacement in a minimum of time.

The liquid separator can be used as an oil separator for internal combustion engines.

Accordingly the outlet opening through which substantially only separated liquid can flow and which faces the separating cartridge can be made in the form of a connector for a line carrying oil back into the oil pan of the internal combustion engine, and the outlet opening through which substantially only gas freed of liquid can flow can be a connection for a gas return line carrying gas into the air filter of the internal combustion engine. The gas return line can, according to another embodiment, run to the induction tube of the internal combustion engine. The oil return line can be, for example, a flexible hose or a siphon whereby the separated oil is delivered into the oil pan, advantageously below the oil level. In this case it is an advantage that the oil does not become frothy and impair the lubrication of the engine. The air cleaned of liquid components can be carried away against the force of gravity and delivered to the air filter also through a flexible hose.

BRIEF DESCRIPTION OF THE DRAWING

The sole FIGURE is a section view of the liquid separator.

DETAILED DESCRIPTION OF THE PREFERRED EMBODIMENT

The FIGURE shows an embodiment of an oil separator for gases from a crankcase of an internal combustion engine. The oil separator 1 includes an outer housing 7 which surrounds the inner housing 9 at an all-around distance therefrom and thereby reduces the danger of the icing up of the separator. An inlet tube 8 with an inlet opening 2 is provided between the outlet openings 3, 4, for feeding in gases laden with oil from the crankcase of the internal combustion engine. A seperating device (6) is disposed in the flow direction (5) between the inlet opening (2) and the outlet openings (3, 4,). The outlet opening 3 through which substantially only separated liquid can flow is arranged for the return of the separated oil in the direction of flow 5 such that the return of the oil is assisted by gravity. The outlet opening 4 branches in the opposite direction and substantially only liquid-freed gas can flow through it, and it is connected by a flexible hose 4.1 to an air filter of the internal combustion engine. The outer housing 7, the inner tube 8, and the outer housing 9 merge integrally with one another in a casting of metal or a high impact plastic that is resistant to the medium. On the end of the L-shaped inner tube facing the outlet opening 3 there is a replaceable separating cartridge 13 which tapers truncoconically toward the outlet opening 3 and is provided with a mesh 11 only in the area of the inner tube 8. The separating cartridge is housed in a cage which is provided with drain struts 14 running toward the oil outlet opening 3. The drain struts have the advantage that the separated oil passes directly into the oil outlet opening 3. The danger that the oil may be picked up again by the air stream which is reversed at the exit from the inner tube 8 and returned through the jacket tube toward the gas outlet opening 4 can thereby be reduced. The separating cartridge 13 can be replaced by removing the cover 15 on the oil outlet opening 3. In this embodiment the cover 15 is fastened by a snap fastening to the jacket tube 7 and sealed against the latter. The lines 2.1, 3.1 and 4.1 at the inlet opening 2 and the outlet openings 3 and 4 can be locked to the jacket tube by snap-fastening means, or by screwing them to an adjoining machine part, or by a hose clamp. The gases carrying oil droplets pass from the line 2.1 of the crankcase into the oil separator and pass first through the preliminary separator 10 which is snapped into the inlet opening 2. The preliminary separator consists of a mesh 11 which is surrounded by a holding ring 12 of stable shape. Replacement is therefore especially simple.

The liquid separator according to the invention permits high degrees of separation at low pressure loss, and by its tube-in-tube design it reduces the danger of icing, thereby assuring good practical characteristics even under adverse ambient conditions, such as temperatures of less than −20° C., for example.

What is claimed is:

1. An apparatus for separating liquids from gases comprising:

an outer housing having an upper outlet opening and a lower outlet opening at opposite ends thereof;

an inner housing contained in said outer housing, a first end of said inner housing communicating with said lower outlet opening;

a substantially L-shaped inlet tube having an inlet opening communicating with the interior of said inner housing; said outer housing, said inner housing and said inlet tube being integral with one another; and a separating cartridge for separating liquids from gases removably disposed at said first end of said inner housing, wherein said inlet opening is disposed horizontal to and between said upper outlet opening and said lower outlet opening.

2. An apparatus for separating liquids from gases comprising:

an outer housing having an upper outlet opening and a lower outlet opening at opposite ends thereof;

an inner housing contained in said outer housing, a first end of said inner housing communicating with said lower outlet opening;

a substantially L-shaped inlet tube having an inlet opening communicating with the interior of said inner housing; said outer housing, said inner housing and said inlet tube being integral with one another; and a separating cartridge for separating liquids from gases removably disposed at said first end of said inner housing, wherein said inlet opening is disposed perpendicular to and between said upper outlet opening and said lower outlet opening.

3. An apparatus for separating liquids from gases comprising:
- an outer housing having an upper outlet opening and a lower outlet opening at opposite ends thereof;
- an inner housing contained in said outer housing, a first end of said inner housing communicating with said lower outlet opening;
- a substantially L-shaped inlet tube having an inlet opening communicating with the interior of said inner housing; said outer housing, said inner housing and said inlet tube being integral with one another; and
- a separating cartridge for separating liquids from gases removably disposed at said first end of said inner housing, wherein said inlet opening is disposed above the separating cartridge and said lower outlet opening of said outer housing, horizontal to and below said upper outlet opening and between said upper outlet opening and said lower outlet opening.

4. The apparatus of claim 3, further comprising a preliminary separator disposed in said inlet tube.

5. The apparatus of claim 4, wherein the separator is a mesh permeable to flow and is surrounded by a mounting ring.

6. The apparatus of claim 5, wherein the separating cartridge is housed in a cage.

7. The apparatus of claim 6, wherein said cage is provided with drain struts directed toward an oil outlet opening.

* * * * *